JOSEPH T. KUMMER
NEILL WEBER
INVENTORS

United States Patent Office 3,413,150
Patented Nov. 26, 1968

3,413,150
BATTERY HAVING A MOLTEN ALKALI METAL ANODE AND A MOLTEN SULFUR CATHODE
Joseph T. Kummer, Ann Arbor, and Neill Weber, Dearborn, Mich., assignors to Ford Motor Company, Dearborn, Mich., a corporation of Delaware
Continuation-in-part of application Ser. No. 507,624, Oct. 22, 1965. This application Sept. 28, 1966, Ser. No. 582,608
8 Claims. (Cl. 136—6)

This application is a continuation-in-part of our copending application Ser. No. 507,624 filed Oct. 22, 1965, a continuation-in-part of copending application Ser. No. 245,047 filed Dec. 17, 1962, and now abandoned.

This invention is concerned with a novel secondary or rechargeable battery comprising a plurality of electrically connected cells, its composition, construction and operation. The cells of the instant battery are characterized in having a molten alkali metal anode-reactant and a cathodic reactant-electrolyte in contact with and on opposite sides of a solid, half-cell separator that separates said anode-reactant and the anodic half-cell reactions thereof from said cathodic reactant-electrolyte and the cathodic half-cell reactions thereof and comprises a solid electrolyte that is selectively-ionically-conductive with respect to cations of said alkali metal when a difference of electrical potential is provided between said anode-reactant and a cathode in contact with said cathodic reactant-electrolyte. In the operation of this battery, the cells thereof are maintained at a temperature sufficient to maintain both the anode-reactant and the cathodic reactant-electrolyte in molten state. The cathodic reactant-electrolyte is electrochemically reversibly reactive with cations of said alkali metal.

In one preferred embodiment of this battery, the anode-reactant is molten sodium, the cathodic reactant-electrolyte comprises molten sulfur and ionically conductive material which, at least after cell operation is initiated, is at least partially sodium ions, and the solid electrolyte interposed therebetween is a crystalline structure consisting of a crystal lattice, of which at least a major proportion by weight consists of ions of aluminum and oxygen in crystal lattice combination and sodium ions which migrate in relation to said crystal lattice under the influence of an electric field. To avoid unnecessary duplication of description, this embodiment is hereinafter given particular attention in describing and illustrating this inventon.

Ths invention will be more readily understood from the following description of exemplary embodiments of this battery, its construction and operation, reference being made to the accompanying drawings, wherein.

Figure 1:
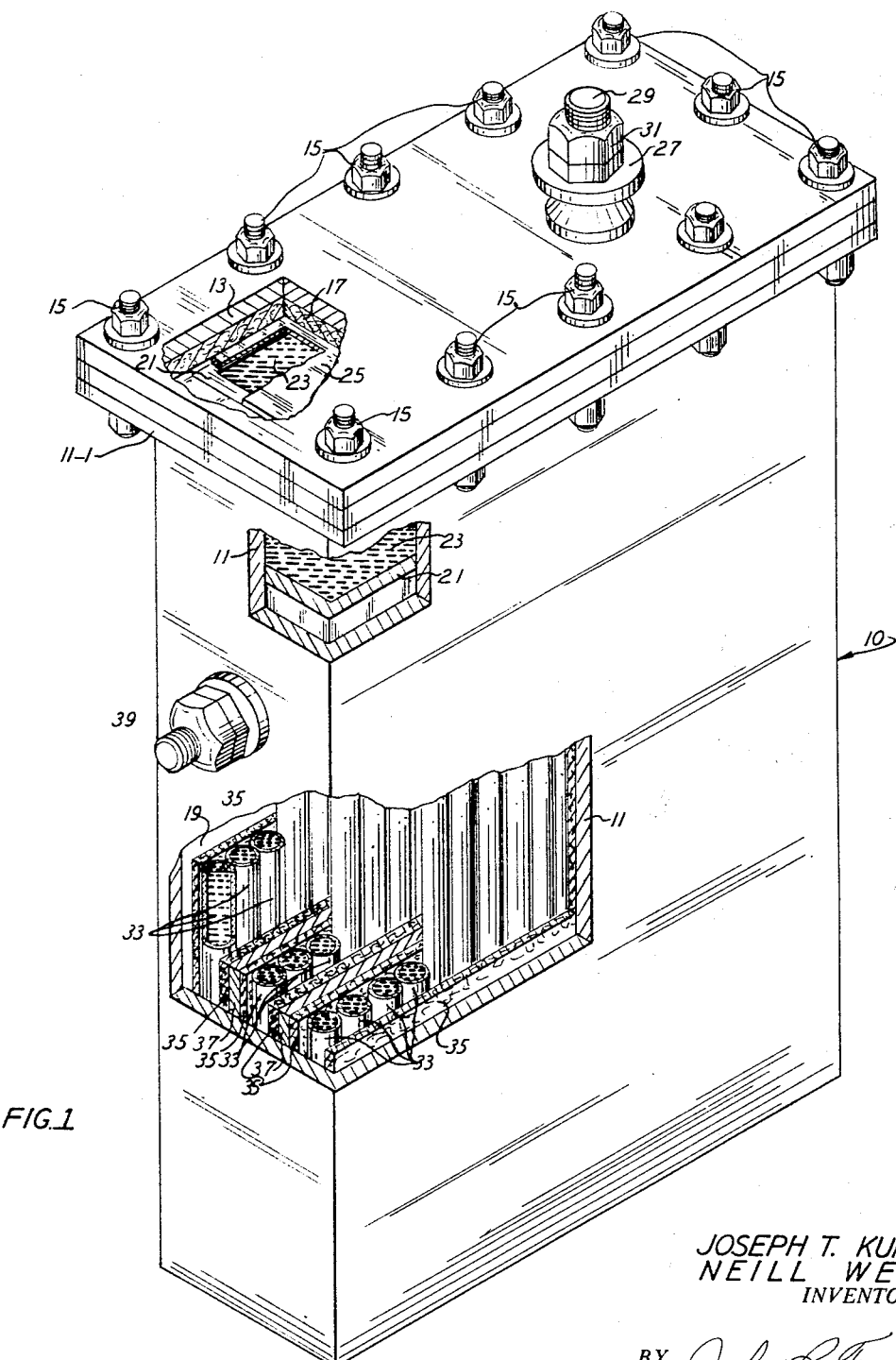
FIGURE 1 is a perspective view of one embodiment of the battery of this invention with portions of the exterior housing and internal components removed to illustrate these and other internal components, their arrangement, construction and function.

Referring now to FIGURE 1, the battery 10 comprises an external metal housing 11 having an outwardly extending flange 11–1 and an open top closed by metal cover plate 13. Cover plate 13 is secured to flange 11–1 by a plurality of bolt assemblies 15. Between cover plate 13 and flange 11–1 is positioned a sealing member 17, an asbestos gasket. The gasket also serves as a cushion between the metal cover plate and housing.

Housing 11 and its top enclosure form a chamber 19. In the upper portion of chamber 19 there is positioned one or more reservoirs 21 which contain the anode-reactant, molten alkali metal, 23, e.g. molten sodium. Reservoir 21 is a substantially enclosed vessel having a top 25. Reservoir 21 has inlet means, not shown, through top 25 which can be in fluid communication with an opening in cover plate 13 indicated externally by inlet means 27 which is shown closed by bolt 29 and nut 31. Bolt 29 is in contact with the anode-reactant in reservoir 21 and serves as the negative lead from battery 10. Bolt 29 is electrically insulated from cover plate 13.

Extending below and in fluid communication with reservoir 21 are a plurality of polycrystalline, cationically-conductive, tubes 33 into which the molten sodium flows from reservoir 21. Positioned on opposite sides of the rows of tubes 33 are suitably conductive fibrous sheets 35, e.g. carbonized felt or cloth impregnated with the cathodic reactant-electrolyte, an ionized combination of sodium and sulfur such as molten $Na_2S_5$, sulfur impregnated with graphite powder, or sulfur alone where the conductive fibrous sheets provide sufficient conductivity between the tubes 33 and the primary cathode to initiate operation of the cell. Between the internal pairs of fibrous sheets 35 are metal plates 37 which are in electrical connection with housing 11. The plates 37 together with housing 11 comprise the cathodes of the battery. It will be understood that housing 11 may be formed of a suitable nonconductor. Plates 37 together with tubes 33 and the interposed cathodic reactant-electrolyte may be arranged in a variety of ways. Individual cells which may include a plurality of tubes 33 may be electrically interconnected in parallel and/or in series. Bolt 39, the positive lead of the battery, is in electrical connection with housing 11.

When leads 29 and 39 are electrically connected by a conductor an electrical circuit is formed comprising such conductor, lead 29, anode-reactant 23, cationically-conductive tubes 33, the cathodic reactant-electrolyte with which fibrous sheets 35 are impregnated, fibrous sheets 35, cathode plates 37 and lead 39. In the discharge cycle, the anode-reactant 23, i.e. molten sodium in reservoir 21 and tubes 33, gives up electrons to the external circuit via lead 29 thereby forming sodium ions which are attracted to the sulfur of the cathodic reactant-electrolyte and pass through the selectively-cationically-conductive tubes 33. The sulfur impregnated in the fibrous sheets 35 accepts electrons from the external circuit via lead 39 forming sulfur ions providing further attraction for sodium ions from the anodic half-cell. In the charging cycle, the cationically-conductive separator, tubes 33, admit of selective return of sodium ions from the cathodic reactant-electrolyte through the separator into the anodic reservoir when an electric current is passed through the cell in recharging. The separators employed herein are essentially impermeable to the reactants when in the form of elements, compounds or anions.

The cationically-conductive separator or solid electrolyte here represented by tubes 33 is, as aforementioned, a polycrystalline structure having a crystal lattice of which at least a major proportion by weight is aluminum ions and oxygen ions in crystal lattice combination and alkali metal ions which migrate in relation to such lattice when a difference of electrical potential is provided on opposite sides thereof.

In one embodiment, the separators are polycrystalline, bimetal oxides having a crystal lattice consisting essentially of ions of aluminum and ions of oxygen in crystal lattice combination. The materials which unite to form the crystalline structure may consist solely of aluminum oxide and sodium oxide in proper proportions. A typical powder mix prior to sintering contained about 7–10 wt. percent $Na_2O$, balance essentially $Al_2O_3$. These separators, their composition and methods for their preparation are described in detail in our copending patent application Ser. No. 563,938 filed May 2, 1966.

In a preferred embodiment, the separators are polycrystalline multi-metal oxides which consist of a major proportion by weight of ions of aluminum and oxygen and a minor proportion by weight of metal ions having a valence not greater than 2 in this crystal lattice combination. The metal having a valence not greater than 2 is advantageously lithium, magnesium or a combination of the same. Tubes such as those indicated by numeral 33 in FIGURE 1 have been prepared in accordance with this embodiment by the following procedure:

(1) All starting materials were dried prior to use.

(2) In powdered form $Na_2CO_3$, $LiNO_3$, and $Al_2O_3$ were added to a vessel and mechanically mixed for 30 minutes.

(3) The mix was heated 1250° C. for one hour.

(4) The resultant powder was mixed with a wax binder and sifted into a rubber mold (polyurethane rubber) into which a substantially cylindrical steel mandrel was inserted and served as a core for such mold. The powder was packed in the mold.

(5) The powder and mold were then isostatically pressed at about 90,000 p.s.i.

(6) The mold and core were removed and the resultant tube was slowly heated to about 550° C. to remove the wax binder.

(7) The tubes were sintered in an electric furnace in the presence of powder of the same composition at about 1460° C. for about two hours.

A typical composition of the powder mix measured prior to sintering contained about 0.99 wt. percent $Li_2O$, 9.99 wt. percent $Na_2O$, balance $Al_2O_3$. A typical composition of the powder mix with magnesium contained about 2.5 wt. percent MgO, 9.0 wt. percent $Na_2O$, balance $Al_2O_3$. The polycrystalline multi-metal oxides of this embodiment, their preparation, and methods for their preparation are described in detail in copending application Ser. No. 500,500 filed by Neill Weber, coinventor herein and Matthew A. Dzieciuch. The disclosures of applications Ser. Nos. 500,500, 507,624, and 563,938 hereinbefore mentioned are herewith incorporated herein by reference and are to be considered a part of the instant disclosure.

The metal plates 37 and housing 11 are preferably formed of aluminum or a suitable alloy thereof with the surfaces which are exposed to the cathodic reactant-electrolyte lined or coated with a suitable metal or alloy. The coating should be physically and chemically resistant to attack by the reactant-electrolyte, e.g. chromium, titanium, Chromel, etc. Such coatings may be prepared by methods well known in the art, e.g. electroplating, application and decomposition of metal salts, vacuum deposition, etc.

The fibrous sheets 35 hold the cathodic reactant-electrolyte and serve as current collectors for the plates 37 providing great surface area per unit volume. Such materials are fabricated from graphite or carbon fibers which are woven into cloth, felted, etc. Among such materials are those described by Louzos et al. in U.S. Patent 3,214,647.

The metal reservoir 21 should be formed of a metal or alloy that resists attack by molten sodium e.g. Chromel. Where a direct seal is to be made with the separator tubes, at least that portion of the vessel contacting the tube should have a coefficient of expansion close to that of the tube, e.g. niobium. In other embodiments, this type of direct seal can be avoided.

Figure 2:
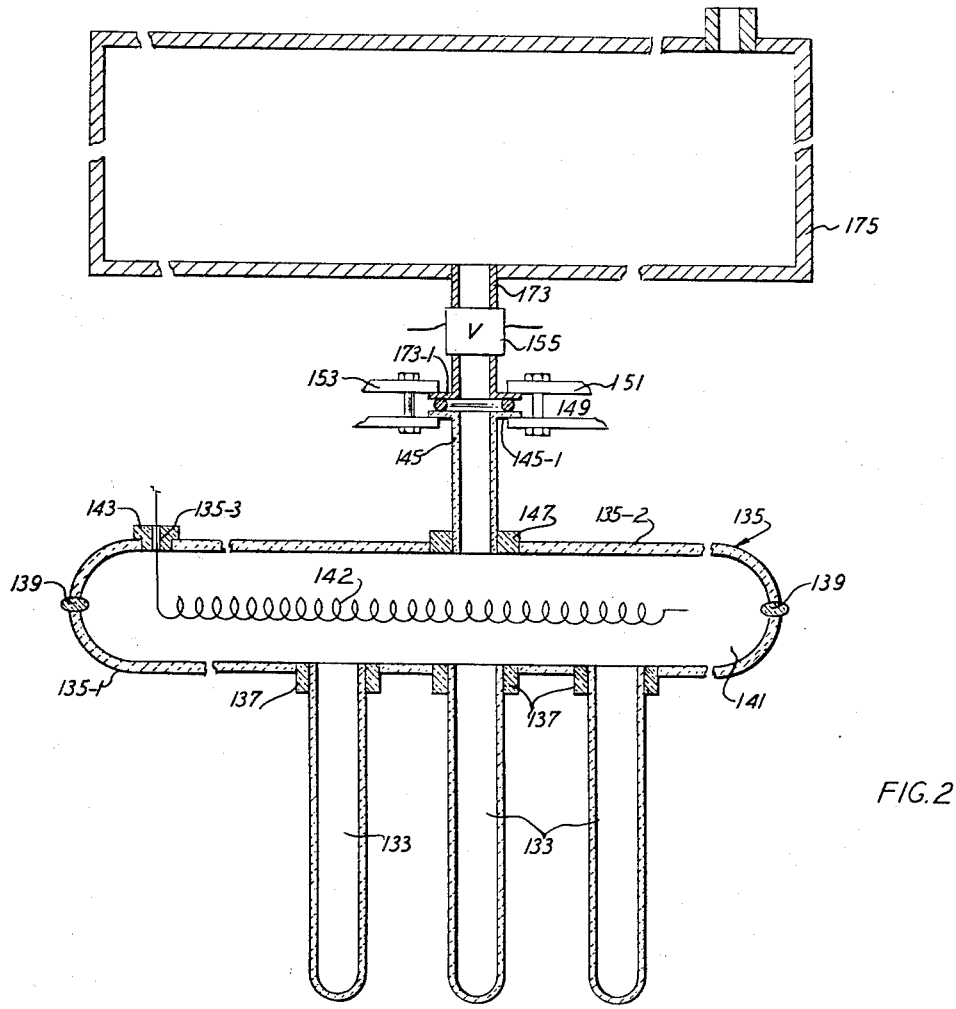
FIGURE 2 is a schematic side view, partially in cross section, of a different embodiment of the anode-reactant container and feed system of the battery of FIGURE 1.

Referring now to FIGURE 2, there is shown another embodiment of the anode-reactant reservoir assembly. In this embodiment, a row of tubes 133 serve the same function as tubes 33 of FIGURE 1. Tubes 133 are in fluid communication with a manifold 135. Tubes 133 and manifold 135 are formed of the same material as tubes 33 of FIGURE 1. Tubes 133 are secured to manifold 135 by glass seals 137. Manifold 135 comprises a lower plate 135—1 and upper plate 135–2 sealed together by glass seals 139 forming a chamber 141. Chamber 141 serves as a small reservoir for immediate feeding of the anode-reactant to the tubes 133 and contains a metal anode 142 which exits through an aperture 135–3 in manifold 135. Aperture 135–3 is sealed with a glass seal 143. Chamber 141 of manifold 135 is in fluid communication with a tube 145. Tube 145 and manifold 135 are in sealed relationship via glass seal 147. Tube 145 is in fluid communication with metal tube 173 which in turn is in fluid communication with primary reservoir 175. Tube 145 has an outwardly extending flange 145–1 at its upper end which faces a corresponding flange 173–1 at the lower end of tube 173. Positioned between flanges 145–1 and 173–1 is a metal O-ring 149. Flange 45–1 and flange 173–1 are held between clamping means 151 and 153 which can be tightened to compress flanges 145–1 and 173–1 upon O-ring 149. A plurality of reservoirs such as 175 may be used to individually feed a plurality of manifolds such as 135. Where the cells fed by the manifolds are connected in parallel, one reservoir such as 175 may be used to supply a plurality of manifolds supplying the tubes of a plurality of cells. With the anode lead positioned in manifold 135 and the main reservoir spaced a distance therefrom and connected only by a very small conduit, the anode-reactant in reservoir 175 can be maintained at a much lower temperature than that employed in the reaction zone, e.g. 100° C. when temperature of the sodium in the manifold and tubes is kept at about 300° C. Also shown in FIGURE 2 is valve 155. Valve 155 provides means for closing off the supply of anode-reactant to the manifold when the cell is not operating properly or has been damaged. Valve 155 may be a spring loaded, hermetically sealed solenoid type valve that is electrically connected to the external circuit and actuated when the voltage of the external circuit drops below a predetermined figure.

Figure 3:
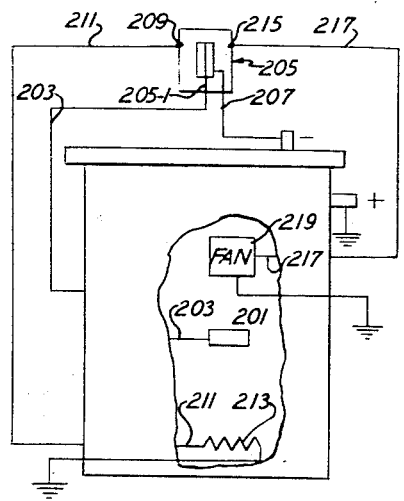
FIGURE 3 is a schematic view of one embodiment of temperature control means which may be utilized in the operation of the battery of this invention.

Temperature control of the battery can be effected by a variety of means. In one embodiment, a portion of the energy output of the battery is relegated to this function. One such embodiment is illustrated in FIGURE 3. In the embodiment shown in FIGURE 3, a portion of the battery housing 200 is cut away to reveal a temperature probe 201 positioned within the battery. Probe 201 is in the thermal connection with a bimetal switch arm 205–1 of switch 205 via conductor 203. Switch arm 205–1 is in electrical connection with the negative terminal of the battery via conductor 207 and is preset to occupy an open position over a predetermined operating temperature range. When the temperature of the cell falls below a predetermined figure, switch arm 205–1 moves to contact 209 closing a heating circuit including conductor 211 and resistance heating means 213. When the temperature rises to a predetermined level, the contact is broken and the circuit opened. When the temperature of the cell rises above a predetermined level, as when a heavy drain of electrical energy is required of the battery, swing arm 205–1 moves to contact 215 closing a cooling circuit which includes conductor 217 and cooling means, here exemplified by fan 219. Housing 200 has inlet and outlet means, not shown, which open to permit passage of air through heat exchange passageways inside housing 200 upon actuation of fan 219 and close when the temperature of the cell falls to a predetermined level causing switch arm 205–1 to move away from contact 215 breaking the cooling circuit.

It is to be understood that this invention is not limited to the examples herein shown and described, but that changes and modifications may be made without departing from the spirit and scope of the invention, as defined in the appended claims.

We claim:

1. A secondary battery comprising in combination a battery housing, at least one anodic half-cell unit within said housing defining an anode-reactant chamber at least a portion of which is defined by a cationically-conductive crystalline structure, a molten alkali metal within said anode-reactant chamber, a conductor extending from within said anode-reactant chamber and in contact with said molten alkali metal, a cathodic half-cell unit within said housing at least a portion of which is defined by said crystalline structure, a cathode within said cathodic half-cell unit spaced apart from said crystalline structure, an electrically conductive fibrous material within said cathodic half-cell unit, in electrical contact with and providing electrical connection between said cathode and a surface of said crystalline structure, and in contact with a cathodic reactant-electrolyte that is electrochemically reversibly reactive with said alkali metal, and temperature control means for maintaining said alkali metal and said cathodic reactant-electrolyte in liquid state, said crystalline structure providing the sole means for reactant transfer between said anode-reactant chamber and said cathodic half-cell unit, being selectively-ionically-conductive with respect to cations of said alkali metal when a difference of electrical potential is provided between said alkali metal and said cathode, is essentially impermeable to said alkali metal and to anions of said cathodic reactant-electrolyte, and consists essentially of a crystal lattice of which at least a major proportion by weight is ions of aluminum and ions of oxygen in crystal lattice combination and alkali metal ions which migrate in relation to said crystal lattice under influence of an electric field.

2. A battery in accordance with claim 1 wherein said crystalline structure consists essentially of ions of aluminum and oxygen in crystal lattice combination and alkali metal ions which migrate in relation to said crystal lattice when a difference of electrical potential is impressed on opposite sides of said structure.

3. A battery in accordance with claim 2 wherein said alkali metal is sodium and said cathodic reactant-electrolyte comprises ions of sodium and ions of sulfur.

4. A battery in accordance with claim 1 wherein said crystalline structure consists essentially of a crystal lattice which consists essentially of a major proportion by weight of ions of aluminum and ions of oxygen and a minor proportion by weight of metal ions having a valence not greater than 2 in crystal lattice combination and alkali metal ions which migrate in relation to said crystal lattice when a difference of electrical potential is impressed on opposite sides of said structure.

5. A battery in accordance with claim 4 wherein said metal having a valence of not greater than 2 is lithium,
said alkali metal is sodium and said cathodic reactant-electrolyte comprises ions of sodium and ions of sulfur.

6. A battery in accordance with claim 4 wherein said metal having a valence not greater than 2 is magnesium, said alkali metal is sodium and said cathodic reactant-electrolyte comprises ions of sodium and ions of sulfur.

7. A secondary battery comprising in combination a battery housing, an anodic half-cell unit within said housing comprising a plurality of cationically-conductive tubular members in fluid communication with a common reservoir, a molten alkali metal within said anodic half-cell unit and within said tubular members thereof, a conductor in electrical contact with said molten alkali metal, a cathodic half-cell unit within said housing at least a portion of which is defined by the exterior of said tubular members, a cathode within said cathodic half-cell unit spaced apart from said anodic half-cell unit, an electrically conductive fibrous material within said cathodic half-cell unit, in electrical contact with and providing electrical connection between said cathode and exterior surfaces of said tubular members, and in contact with a cathodic reactant-electrolyte that is electrochemically reversibly reactive with said alkali metal, and temperature control means for maintaining said anode-reactant and said cathodic reactant-electrolyte in liquid state and within a predetermined temperature range when said battery is being discharged, said tubular members consisting essentially of a solid electrolyte that is selectively-ionically-conductive with respect to cations of said alkali metal when a difference of electrical potential is provided between said alkali metal and said cathode, is essentially impermeable to said alkali metal and to anions of said cathodic reactant-electrolyte, and consists essentially of a crystal lattice of which at least a major proportion by weight is ions of aluminum and ions of oxygen in crystal lattice combination and alkali metal ions which migrate in relation to said crystal lattice under influence of an electric field.

8. A battery in accordance with claim 7 wherein the alkali metal within said common reservoir is maintained at a temperature at least 100° C. below the temperature of the alkali metal within said tubular members when said battery is being operated.

References Cited
UNITED STATES PATENTS
3,245,836  4/1966  Agruss _____ 136—83

WINSTON A. DOUGLAS, *Primary Examiner.*

C. F. LE FEVOUR, *Assistant Examiner.*